United States Patent
Thyni et al.

(10) Patent No.: US 9,585,032 B2
(45) Date of Patent: Feb. 28, 2017

(54) METHOD AND ARRANGEMENT FOR PROVIDING DATA PLANE REDUNDANCY

(75) Inventors: Tomas Thyni, Järfälla (SE); Mats Forsman, Rönninge (SE); Albin Johansson, Haninge (SE); Johan Meyer, Rönninge (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 14/413,591

(22) PCT Filed: Jul. 12, 2012

(86) PCT No.: PCT/SE2012/050829
§ 371 (c)(1),
(2), (4) Date: Jan. 8, 2015

(87) PCT Pub. No.: WO2014/011092
PCT Pub. Date: Jan. 16, 2014

(65) Prior Publication Data
US 2015/0138959 A1 May 21, 2015

(51) Int. Cl.
H04L 12/26 (2006.01)
H04W 24/04 (2009.01)
H04B 10/40 (2013.01)

(52) U.S. Cl.
CPC ............ *H04W 24/04* (2013.01); *H04B 10/40* (2013.01); *H04Q 2213/13098* (2013.01); *H04Q 2213/13167* (2013.01)

(58) Field of Classification Search
None
See application file for complete search history.

(56) References Cited

U.S. PATENT DOCUMENTS

| | | | |
|---|---|---|---|
| 6,058,120 A | 5/2000 | Sabzevari | |
| 7,450,494 B2 | 11/2008 | Koyuncuoglu | |
| 7,542,681 B2 | 6/2009 | Cornell | |
| 8,103,801 B1 * | 1/2012 | Sardella | G06F 11/325 |
| | | | 710/1 |
| 2004/0228627 A1 | 11/2004 | Alana | |
| 2005/0089331 A1 | 4/2005 | Margalit | |
| 2006/0008210 A1 | 1/2006 | Cornell et al. | |

(Continued)

FOREIGN PATENT DOCUMENTS

| | | | | |
|---|---|---|---|---|
| CH | EP 2892239 A1 * | 7/2015 | ........... | G02B 6/4201 |
| WO | WO 2009129151 A1 * | 10/2009 | ............. | H04L 49/30 |

*Primary Examiner* — Michael J Moore, Jr.

(57) ABSTRACT

A pluggable transceiver is provided for achieving a redundant connection in a communication network when inserted in a communication network node of the communication network. The pluggable transceiver is connected to a first cable on a first input and is directly connected to two or more data-plane ports when inserted. The pluggable transceiver comprises a converter to receive incoming data in a first representation and convert the incoming data from the first representation into a second representation, and a distributor to distribute the incoming data to a first data-plane port among the two or more data-plane ports in the second representation. The pluggable transceiver comprises a first selector to select the first data-plane port and receive outgoing data from the first data-plane port in the second representation, where the first data-plane port is active.

18 Claims, 7 Drawing Sheets

(56) References Cited

U.S. PATENT DOCUMENTS

| | | | | |
|---|---|---|---|---|
| 2006/0015643 A1* | 1/2006 | Orava | ................ | H04L 12/4645 |
| | | | | 709/238 |
| 2006/0050631 A1 | 3/2006 | Koyuncuoglu et al. | | |
| 2009/0110399 A1 | 4/2009 | Aihara | | |
| 2009/0303883 A1* | 12/2009 | Kucharczyk | ........ | H04L 12/4645 |
| | | | | 370/241 |
| 2012/0023340 A1* | 1/2012 | Cheung | .................. | G06F 1/266 |
| | | | | 713/300 |
| 2015/0125158 A1* | 5/2015 | El-Ahmadi | ........... | H04L 1/0057 |
| | | | | 398/135 |

* cited by examiner

METHOD AND ARRANGEMENT FOR PROVIDING DATA PLANE REDUNDANCY

This application is a 371 of International Application No. PCT/SE2012/050829, filed Jul. 12, 2012, the disclosure of which is fully incorporated herein by reference.

TECHNICAL FIELD

The present disclosure relates generally to a method and an arrangement in a node in a communication network for achieving redundant communication of data, especially a Single Form factor Pluggable transceiver in an opto-electronic device in the node.

BACKGROUND

When communicating data in communication networks, data is communicated between various communication network nodes on various communication links. Due to different reasons, a connection may be disturbed and fail, which is also the case for arrangements and devices in the communication network nodes.

A "Small Form factor Pluggable transceiver" (SFP) is an transforming component which is used in nodes in communication networks for connecting incoming cables and communication hardware in the communication network nodes, and converting between different media and coding representations. For instance, an SFP will be used for distribution of data between incoming optical fibres and electronic communication hardware and transforms the data between the different representations of the optical fibres and the communication hardware, i.e. between optical formatted data and electrical formatted data. For instance, such communication hardware could be data-plane hardware, or forwarding hardware, such as various network processors, switches or routing ASICs (Application Specific Integrated Circuit), which are applied in accordance with the OSI (Open Systems Interconnection) model on layer 2 and above.

An SFP comprises one or more optical inputs for connecting optical fibres, and one or more electrical outputs for connecting to the communication hardware. The optical inputs are arranged to receive an incoming optical cable, which may comprise one or more optical fibres. SFPs are manufactured for as well single mode fibres as multimode fibres. Typically, an optical cable comprises two optical fibres for transferring data in different directions. However, there are also Bi-Directional optical cables, which use one and the same optical fibre for data transferring in different directions.

Other types of SFPs are also available, as e.g. C-SFP (Compact SFP) which is able to simultaneously serve two data-plane ports, QSFP (Quad SFP) which is able to simultaneously serve four data-plane ports. Enhanced versions of SFPs are also available, as e.g. SFP+ and QSFP+ which are capable to be applied for higher bitrates, typically up to 10 Gbit/s In another variant of SFP, both the first representation and the second representation are electrical but different from each other. Typically, the first electrical representation is then suitable for data transmission between communication network nodes and the second electrical representation is suitable for data transmission internally within a communication network node. In such SFPs the connected communication network nodes are connected by electrical cables.

In this description the term "data-plane" will be used to define a part of the architecture of an arrangement in a communication network node which is an interface to another communication network node with which the present communication node exchanges data, as well as connection between node internal data-planes. For instance, a data-plane connects a core network node with the present communication network node. In literature, the term forwarding plane is sometimes alternatively used instead of data-plane.

Transport of information from a radio base station (RBS) to a communication node has traditionally been performed on a single connection. However, if a connection will be cut-off or be seriously disturbed, an RBS will lose its communication with the communication node.

Figure 1:
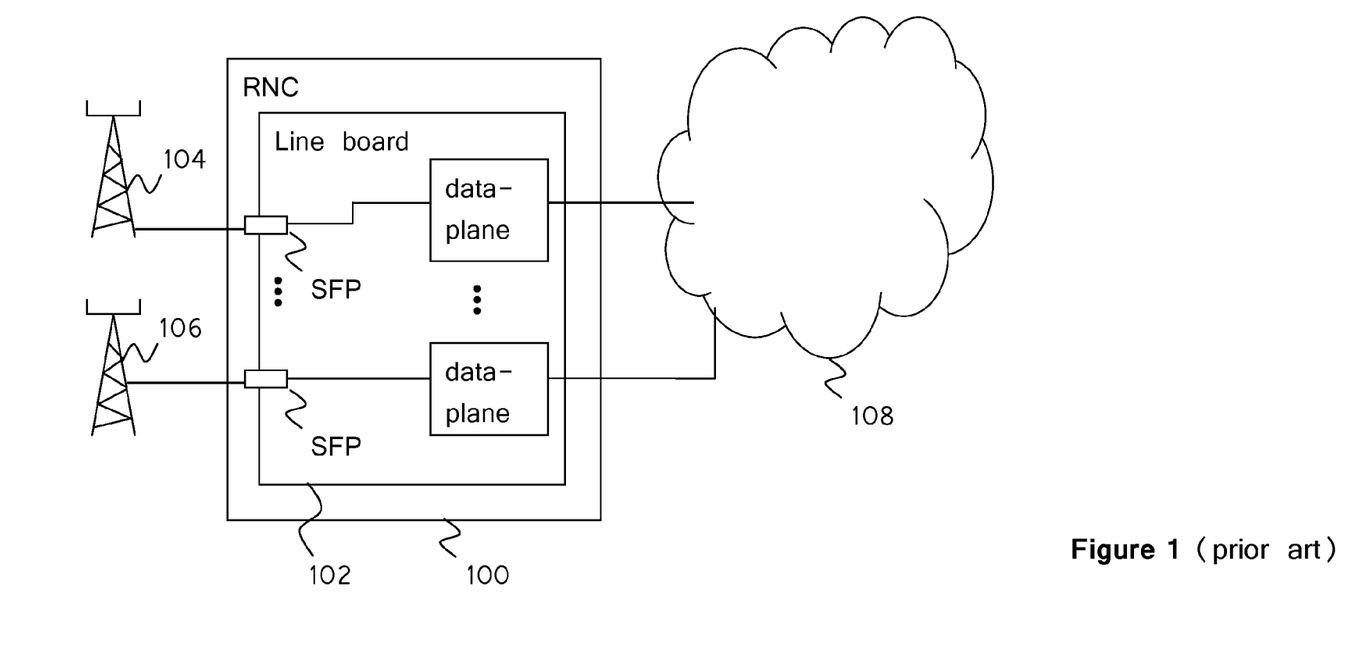
FIG. 1 is an overview illustration, illustrating a communication scenario according to the prior art.

With reference to FIG. 1, a situation in a communication network will now be described.

A radio network controller (RNC) 100 is arranged to distribute data from a plurality of RBSs 104, 106 to a core network 108, where each RBS 104, 106 communicates data on a respective single connection (not referred to). Each one of the connections is connected to a line board 102 of the RNC 100 with a respective SFP to a data-plane ports (not shown), as seen in the figure. In case of communication failure for a connection or a defect SFP, the respective RBS 104, 106 loses its connection and will not be able to communicate with the core network 108 any longer.

Figure 2:
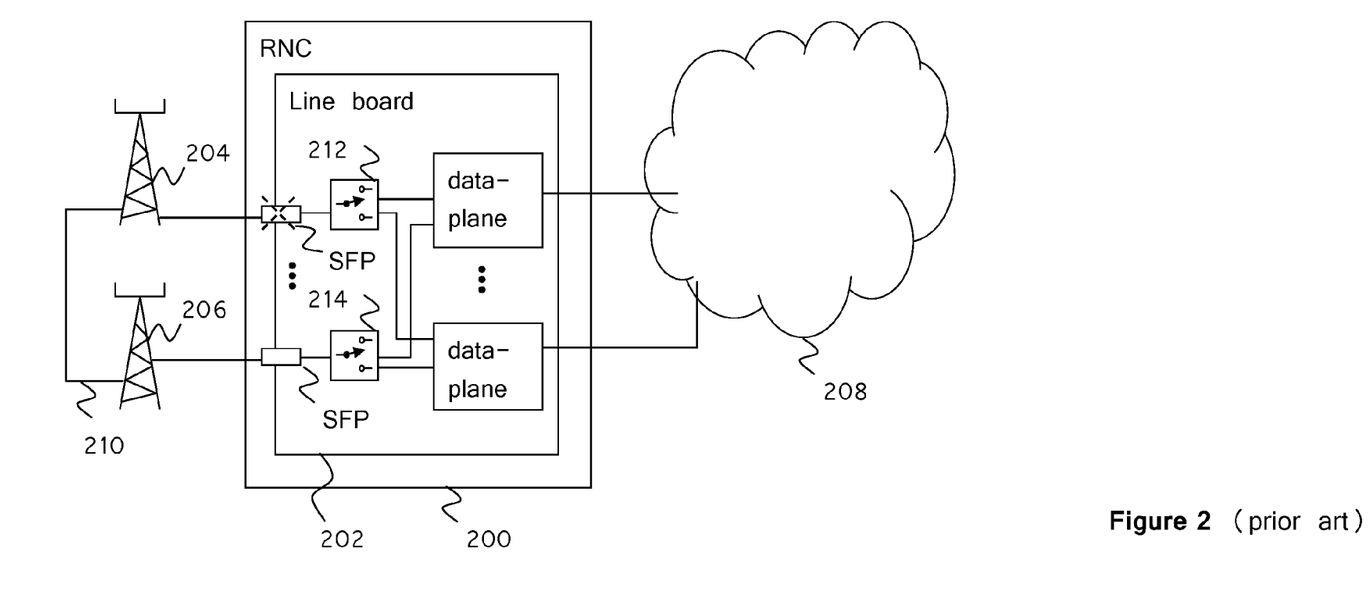
FIG. 2 is an overview illustration, illustrating a communication scenario according to the prior art.

One way to overcome the above described disadvantage is to provide redundancy to the connection, and a situation where redundancy is provided will now be described with reference to FIG. 2. A radio network controller (RNC) 200 is arranged to distribute data from a plurality of RBSs 204, 206 to a core network 208, where each RBS 204, 206 communicates data on a respective single connection (not referred to). Each one of the connections is connected to a line board 202 of the RNC 200 with a respective SFP to a respective data-plane port (not shown). The situation is similar to the situation described with reference to FIG. 1, but is completed with functionality for providing redundancy to the connection. As seen in the figure, each SFP is additionally connected to a further data-plane, and the RBSs are interconnected to each other by an interconnecting cable 210. Furthermore, are switches 212, 214 additionally arranged at the line board 202. In this situation, the SFP to which the first RBS 204 is connected is defect (indicated by a dashed cross in the figure), and the first RBS applies instead the interconnecting cable 210 to communicate with the RNC 200 via the second RBS 206. Thereby, by using data-plane ports of the other RBSs 204, 206, the RBSs 204 and 206 are able to communicate via respective active data-plane ports, and further with the core network 208.

When designing a communication system for providing communication between RBSs and the core network, there is a need to achieve a more robust redundant communication system.

SUMMARY

It would be desirable to obtain a less complex redundant communication system. It is an object of the solution to address at least some of the issues outlined above. Further, it is an object of the solution to provide a mechanism for enabling a design of a communication network node that is robust and flexible. These objects may be met by a method and apparatus according to the attached independent claims.

According to one aspect a method performed in a pluggable transceiver is provided for achieving a redundant connection in a communication network when the pluggable transceiver is inserted in a first communication network node of the communication network. The pluggable transceiver is connected to a first cable on a first input and directly connected to two or more data-plane ports when inserted. In the method, incoming data is received in a first representation from a second communication network node in the communication network. The incoming data is converted into a second representation, a first data-plane port among the two or more data-plane ports is selected, the first data-plane port being active, and the incoming data is distributed in the second representation to the first data-plane port.

Furthermore, when selecting the first data-plane port, the selection may be based on information received on an external interface, e.g. in accordance with an I²C standard, or based on a detection of which data-plane port that is active performed by a detector arranged in the pluggable transceiver. Moreover, the pluggable transceiver may further be connected to one or more further cables on respective further inputs, wherein one or more further data-plane ports among the two or more data-plane ports are selected when selecting. The further data-plane ports are active, and incoming data received on the further cables is then distributed to corresponding respective further data-plane ports when distributing.

According to another aspect, a method performed in a pluggable transceiver is provided for achieving a redundant connection in a communication network when the pluggable transceiver is inserted in a first communication network node of the communication network. The pluggable transceiver is connected to a first cable on a first input and directly connected to two or more data-plane ports when inserted. In the method, a first data-plane port is selected among the two or more data-plane ports, where the first data-plane port is active, and outgoing data from the first data-plane port is received in a first representation. Furthermore, the received outgoing data is converted into a second representation, and the outgoing data is sent in the second representation to a second communication network node in the communication network.

Furthermore, selecting the first data-plane port may be based on detection that one of the two or more further data-plane ports is active, or may be based on information received from the first communication network node on an external interface, e.g. in accordance with an I²C standard.

Moreover, the pluggable transceiver may be further connected to one or more further cables on respective further inputs. Then, one or more further data-plane ports among the two or more data-plane ports are selected when selecting, the further data-planes being active, and the outgoing data received from the further data-plane ports is distributed to corresponding respective cables when sending.

According to yet another aspect, a pluggable transceiver is provided for achieving a redundant connection in a communication network when inserted in a communication network node of the communication network. The pluggable transceiver is connected to a first cable on a first input and is directly connected to two or more data-plane ports when inserted. The pluggable transceiver comprises a converter adapted to receive incoming data in a first representation and convert the incoming data from the first representation into a second representation, and a distributor adapted to distribute the incoming data to a first data-plane port among the two or more data-plane ports in the second representation. Moreover, the pluggable transceiver comprises also a first selector adapted to select the first data-plane port and receive outgoing data from the first data-plane port in the second representation, where the first data-plane port is active, and the converter being further adapted to convert the outgoing data from the second representation into the first representation and transmit the outgoing data in the first representation on the first cable.

Furthermore, the first selector may further comprise a detector adapted to detect that one data-plane port among the two or more data-plane ports is active and the first selector may be adapted to select the data-plane port being detected as active as the first data-plane port. The first selector and the distributor may further be adapted to receive information from the first communication network node, on an external interface, e.g. in accordance with an I²C standard, and select the first data-plane port in based on the received information.

Moreover, the pluggable transceiver may be further adapted to be connected to one or more further cables on respective further inputs. The converter is then further adapted to receive incoming data from the further cables in a first representation and convert from the first representation into the second representation. The distributor is then further adapted to distribute incoming data from the further cables to corresponding respective data-plane ports among the two or more data-plane ports when distributing the incoming data in the second representation. The first selector is then further adapted to select one or more further data-plane ports among the two or more data-plane ports and receive outgoing data from the further data-plane ports in the second representation, the further data-plane ports being active, and the converter is further adapted to convert the outgoing data from the further data-plane ports from the second representation into the first representation and transmit the outgoing data from the further data-plane ports in the first representation to the corresponding further cables.

The pluggable transceiver may be adapted to be directly connected to a plurality of data-plane ports, e.g. 4, 8, 16, etc., and a plurality of cables being less than the number of data-plane ports.

The above methods and pluggable transceiver may be used to obtain a robust redundant communication situation in a communication network. Furthermore, communication network nodes may require less power to operate properly, which may give rise to less need of cooling arrangements.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to achieve redundant communication of data in communication networks where pluggable transceivers are arranged in communication network nodes for exchanging data between other communication network nodes and data-plane ports, by applying an alternative pluggable transceiver which is connected to two or more data-plane ports and selecting an active data-plane port. The pluggable transceivers are connected to other communication network nodes by cables, and are directly connected to a plurality of data-plane ports.

The exemplifying embodiments, which will be described below, are examples of implementations according to the concept in HSPA (High Speed Packet Access) communication networks which are often referred to as 3G networks. However, it is to be noted that the concept is not limited to be applied in HSPA networks, but may also be applied in any communication network where remote communication network nodes are connected by communication cables to pluggable transceivers in a communication network node, where the pluggable transceivers are connected to data-plane ports. For instance, the concept may be applied in LTE (Long Term Evolution) communication networks where eNodeBs are connected by communication cables to pluggable transceivers in Serving GateWays, or in fixed communication networks where access nodes such as Digital Subscriber Line Access Multiplexers (DSLAM) or Optical Line Terminals (OLT) are connected via communication cables to pluggable transceivers in Edge Routers.

Figure 3A:
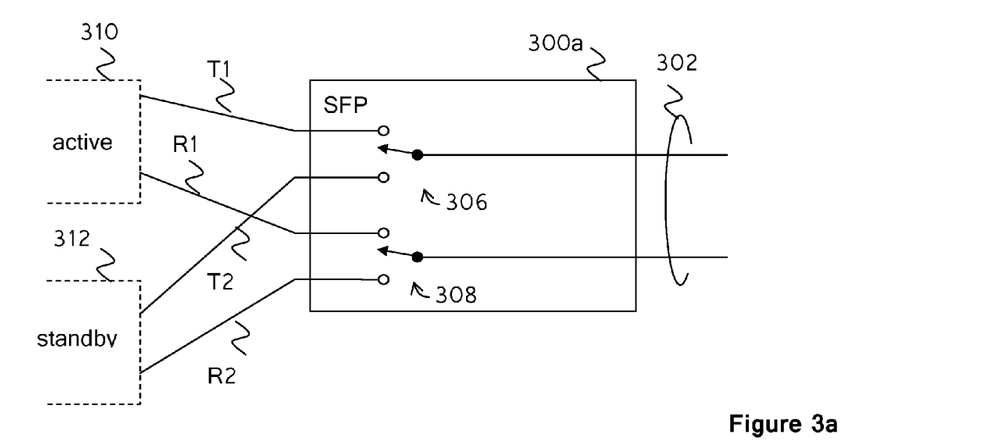
FIGS. 3a-b are block diagrams schematically illustrating pluggable transceivers, according to possible exemplifying embodiments.

With reference to FIG. 3a, a principle arrangement in a pluggable transceiver 300a for achieving redundant communication of data will now be schematically described in accordance with one exemplifying embodiment. The pluggable transceiver 300a is adapted to be inserted in a socket of an arrangement in a communication network node, e.g. a switch, a router, or any other suitable communication arrangement for connecting communication network nodes to data-plane ports connected to a cable 302 on an input of the pluggable transceiver. The pluggable transceiver 300a comprises a second selector 306 to which the cable 302 is connected on an input (not referred to). Moreover, the second selector 306 is directly connected T1, T2 to a pair of data-plane ports for delivering incoming data from the cable 302. A first data-plane port is active and a second data-plane port is in a standby mode as indicated in the figure, and the second selector 306 is arranged to deliver data received on the cable 302 to the active data-plane port.

The pluggable transceiver 300a comprises also a first selector 308 which is directly connected R1, R2 to the pair of data-plane ports and connected to the cable 302 on an input, for receiving outgoing data from the active data-plane port and deliver via the cable 302 to the second communication network node.

By connecting the pluggable transceiver 300a directly to a plurality of data-plane ports, and include functionality for selecting an active data-plane port, redundant communication between communication network nodes and data-plane ports is achieved, without any need for external devices and/or units for data-plane port selection. Thereby, there are less devices/units to arrange, which makes the design of the arrangement less complex and less power consuming, e.g. a line board in the communication network node. Less power consumption requires also less cooling of the arrangement. Furthermore, with a less complex design, there are fewer components which can be defect of fail, which limits the single point of failure components.

Both the second selector 306 and the first selector 308 have to be controlled in order to select the active data-plane port. However, any functionality necessary for controlling the selectors 306, 308 has been omitted in the figures, but will be discussed below in conjunction with some other exemplifying embodiments.

Figure 3B:
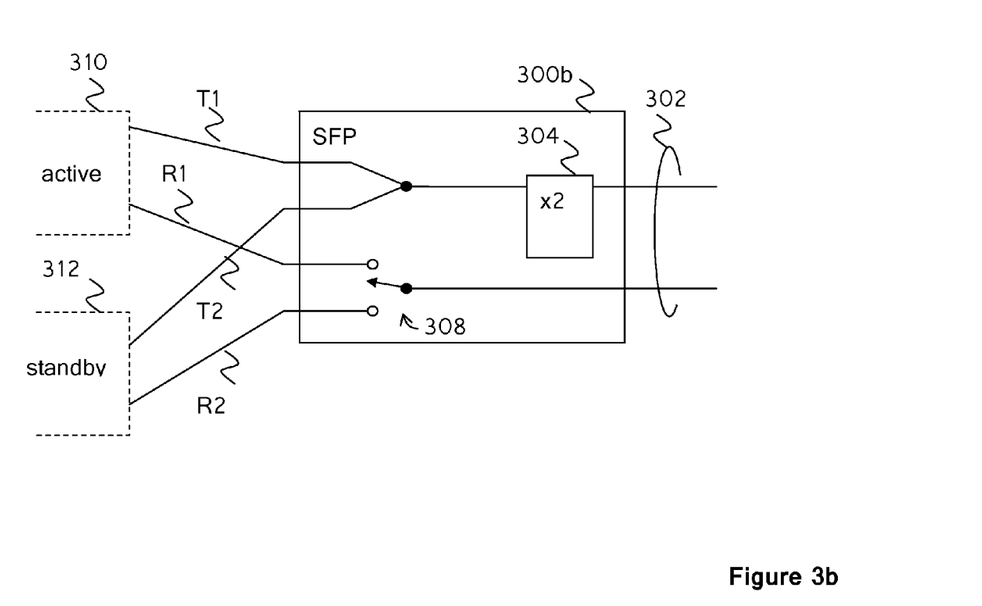

With reference to FIG. 3b, a principle arrangement in a pluggable transceiver 300b for achieving redundant communication of data will now be schematically described in accordance with one exemplifying embodiment. This exemplifying embodiment is based on the above described exemplifying embodiment and the corresponding reference numbers have therefore been used where appropriate.

The pluggable transceiver 300b differs from the pluggable transceiver 300a described with reference to FIG. 3a in that there is no second selector arranged, and that there instead is a copying unit 304 arranged to copy the incoming data when being converted into the second representation and provide to both the data-plane ports which are directly connected. The copying unit 304 is implemented as a suitable unit for delivering an incoming signal comprising data in the second representation to two data-plane ports.

According to some exemplifying embodiments which will be described below, the data in the cable 302 is in general in a first representation and the data which is exchanged with the data-planes is in a second representation. The pluggable transceivers 300a, 300b described above with reference to FIGS. 3a-b comprises therefore additional components to provide functionality, e.g. converter (s) arranged to convert data between the representations. However, such components have been omitted in the figures, but will be described below in other exemplifying embodiments.

Figure 4A:
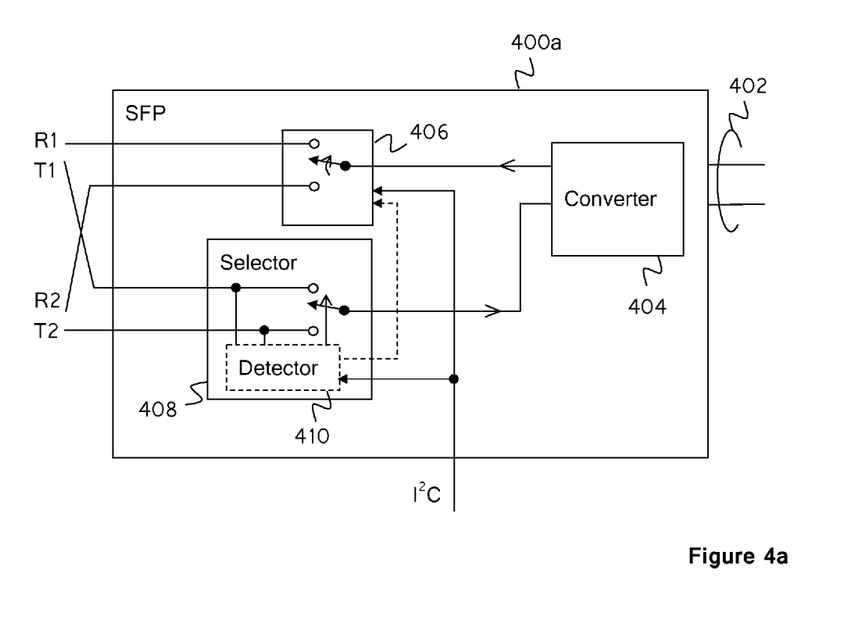
FIGS. 4a-b are block diagrams schematically illustrating pluggable transceivers, according to further possible exemplifying embodiments.

With reference to FIG. 4a, a pluggable transceiver 400a will now be schematically described in accordance with one exemplifying embodiment. The pluggable transceiver 400a is adapted to be inserted in a socket (not seen) in a communication network node of a communication network, for exchanging data between a second communication network node in the communication network (not seen) and data-plane ports which are directly connected to the first communication network node. For instance, the first communication network node may be a radio network controller, which exchanges data on cables between radio base stations and a core network. The pluggable transceiver 400a comprises a converter 404, a first selector 408, and a second selector 406.

The converter 404 is arranged to be connected to another communication network node by a cable 402 on a first input (not seen), for receiving incoming data in a first representation. Typically, the first representation is optical and the cable 402a comprises then one or more optical fibres. However, the first representation is not limited to be optical, it may instead be electrical, and the cable 402 is then a suitable cable for transferring information electrically. The converter 404 is adapted to convert the received data from the first representation into a second representation to be delivered to the data-plane ports T1/R1, T2/R2.

The second selector 406 is arranged to select an active data-plane T1/R1, T2/R2 to deliver the received incoming data to in the second representation. When inserted in the socket, the pluggable transceiver 400a is connected via a pin-out arrangement to two different data-planes T1/R1, T2/R2 of which a first data-plane is active and the second data-plane is in a standby mode. Furthermore, the selection of the active data-plane is controlled by the first communication network node on an interface (marked I²C in FIG. 4a), and the second selector 406 is adapted to select data-plane accordingly. In this exemplifying embodiment the communication network node comprises logic circuits, which decides which data-plane ports to select via a control pin of a pin-out arrangement. However, the concept is not limited to the use an I²C interface, a designer of the pluggable transceiver 400 may instead select alternative arrangements or interfaces, as will be defined below in an alternative exemplifying embodiment.

The first selector 408 is arranged to select the active data-plane and receive outgoing data in the second representation from the active data-plane to be transmitted to the second communication network node. The first selector 408 is also adapted to select the active data-plane controlled by the first communication network node, via an interface I²C. In this exemplifying embodiment, both the first selector 408 and the second selector 406 are controlled simultaneously via the same interface I²C. However, the designer is free to arrange two separate interfaces instead.

The converter 404 is further arranged to convert the outgoing data from the second representation into the first representation and transmit the outgoing data via the cable 402 to the second communication network node in the first representation.

In an alternative exemplifying embodiment, based on the one described above, a detector 410 is arranged in the first selector 408 to detect which data-plane that is active. The detector 410 is here implemented as a new logic function in an Application Specific Integrated Circuit (ASIC) in the SFP, but may alternatively be implemented different in the SFP within the concept, e.g. as any suitable circuit, chip, signalling processor, etc. Because the same data-plane is used both for reception and transmission of data on the cable 402. The detector 410 controls both the second selector 406 and the first selector 408. By arranging the detector 410 in the pluggable transceiver 400a, the interface I²C, described above may be omitted.

Figure 4B:
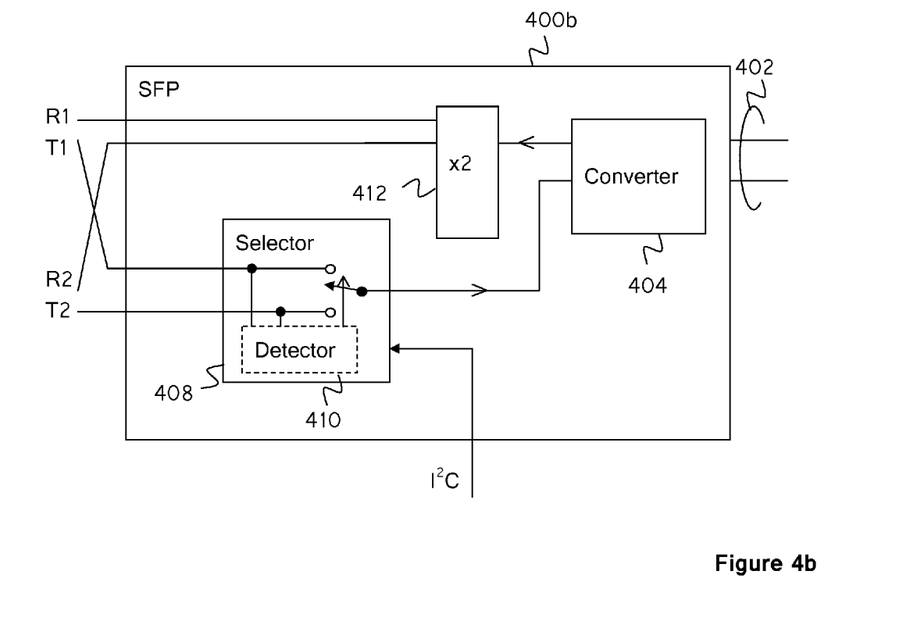

With reference to FIG. 4b, a pluggable transceiver 400b will now be schematically described in accordance with another exemplifying embodiment. In both this exemplifying embodiment and some described above, the pluggable transceivers are designed by arranging first and second selectors 408, 406, and the copying unit 412 in ordinary C-SPFs or C-SPF+s. The resulting pluggable transceivers will in this description be referred to as High Availability SPFs, e.g. HA C-SPF, HA C-SPF+. This exemplifying embodiment is based on the one described with reference to FIG. 4a, and the same reference numbers are therefore used when appropriate.

The pluggable transceiver 400b differs from the one described with reference to FIG. 4a in that there is no second selector arranged, and that there instead is a copying unit 412 arranged to copy the incoming data when being converted into the second representation and provide to both the data-plane ports which are connected. The copying unit 412 is implemented as a suitable arrangement for delivering an incoming signal comprising data in the second representation to two data-plane ports. Correspondingly, the first selector 408 may be equipped with a detector 410, as described above in another exemplifying embodiment.

The pluggable transceivers 400a, 400b described above will typically be designed to be inserted and fit in sockets of equipments for standard Compact Small Form factor Pluggable transceivers (C-SFP) or standard Compact Small Form factor Pluggable Plus transceivers (C-SFP+), and have also the same pin-out arrangement. Each socket of such equipment is directly connected to two data-plane ports. Therefore, when inserting an ordinary C-SFP or C-SFP+ in a socket of the equipment, the C-SFP or C-SFP+ will operate normally, but when instead inserting the pluggable transceivers according to the described exemplifying embodiments, the pluggable transceivers are able to select an active data-plane of the two connected data-planes. Thus, if a cable connected to a pluggable transceiver according to the exemplifying embodiments is defect, another alternative cable and alternative pluggable transceiver may be assigned by the communication network node to be used instead. The high availability pluggable transceiver of the exemplifying embodiment exchanges then the data which should have been exchanged via the defective cable, and its own data via its own cable, and selectors of the high availability pluggable transceiver selects data-plane ports accordingly. Thereby, a redundant communication externally to the node as well as inside the node is achieved, which gives a more robust and flexible communication situation.

In another alternative exemplifying, which is based on some exemplifying embodiments described above, pluggable transceivers may be directly connected to further more data-plane ports and may be adapted to have further cables connected to the second communication network node. For instance, a High Availability QSPF (HA QSPF) may have 1, 2, or 3 cables connected for exchanging data with a second communication node, and may also be directly connected to 4 data-plane ports. In order to make the understanding of the figures easier, such additional cables and data-plane ports have been omitted in the figures above. However, the following table will give an example of the data-plane redundancy situation for different types of transceivers.

| Transceiver | Cables | Data-plane ports | Redundancy factor |
| --- | --- | --- | --- |
| SPF | 1 | 1 | No redundancy |
| SPF+ | 1 | 1 | No redundancy |
| C-SPF | 2 | 2 | No redundancy |
| C-SPF+ | 2 | 2 | No redundancy |
| HA C-SPF | 1 | 2 | 100% |
| HA C-SPF+ | 1 | 2 | 100% |
| QSPF | 4 | 4 | No redundancy |
| QSPF+ | 4 | 4 | No redundancy |
| HA QSPF | 1 | 4 | 300% |
| HA QSPF | 2 | 4 | 100% |
| HA QSPF | 3 | 4 | 33% |
| HA QSPF+ | 1 | 4 | 300% |
| HA QSPF+ | 2 | 4 | 100% |
| HA QSPF+ | 3 | 4 | 33% |

As described above, inserting an ordinary SPF, SPF+, C-SPF, C-SPF+, QSPF, or QSPF+ does not give rise to any redundancy. However, when instead using pluggable HA transducers according to the exemplifying embodiments, redundancy will be achieved. For an HA C-SPF, or an HA C-SPF+, 1 cable is connected and 2 data-plane ports. Then there is 1 redundant data-plane port on 1 cable, which gives rise to a data-plane redundancy of 100%.

For HA QSPFs or HA QSPF+, there are three possibilities for each. There may by 1 cable and 4 data-plane ports, i.e. 3 redundant data-plane ports on 1 cable, which give rise to a redundancy of 300%. The situation for 2 cables and 4 data-plane ports is instead 2 redundant data-plane ports on 2 cables, i.e. a redundancy of 100%. For 3 cables and 4 data-plane ports, there is 1 redundant data-plane port on 3 cables, i.e. a redundancy of 33%.

Figure 5:
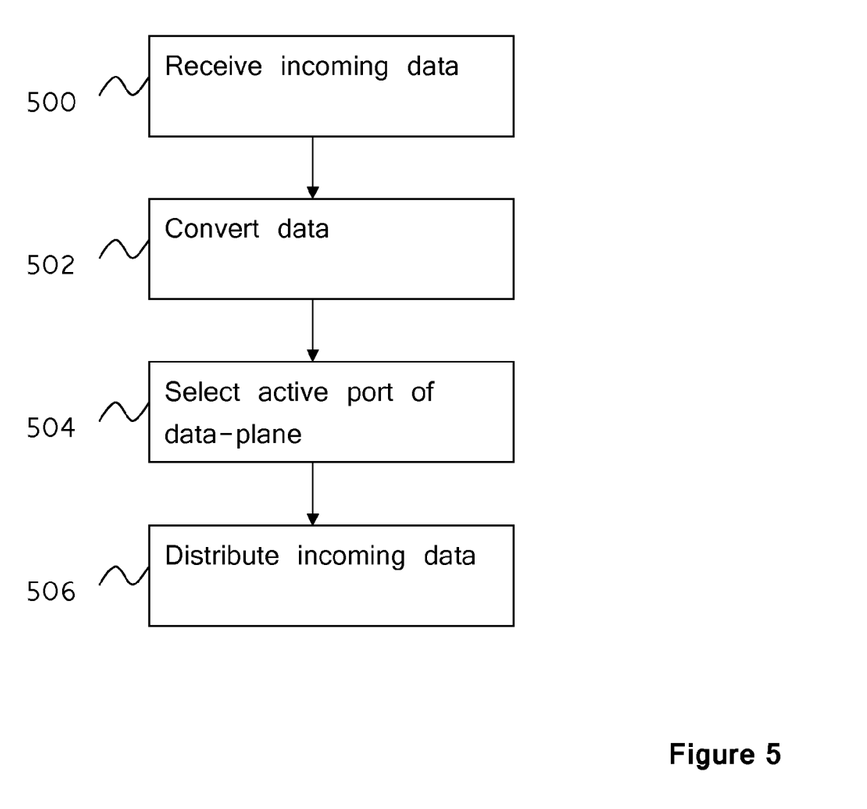
FIG. 5 is a flow chart illustrating a procedure in an arrangement for reception of data, according to a possible exemplifying embodiment.

With reference to FIG. 5, a method in a pluggable transceiver for providing redundant communication of incoming data in a communication network node of a communication network to data-plane ports will now be described in accordance with an exemplifying embodiment. The pluggable transceiver is inserted in a socket of an arrangement, e.g. a line board of the communication network node, and is connected to another second communication network node via a cable. When inserted in the socket, the pluggable transceiver is further directly connected to a plurality of data-plane ports via a pin-out arrangement in the socket. For instance, there may be 2 data-planet ports or 4 data-plane ports to which the pluggable transceiver is directly connected.

In a first action 500, the pluggable transceiver receives incoming data from the second communication network node via the cable. The incoming data is in a first representation, and is in subsequent action 502 converted into a second representation. Typically, the first representation is suitable for communication of data over longer distances, e.g. between communication network nodes, and the second representation is suitable for communication of data on shorter distances, e.g. internally within a communication network node. In this exemplifying embodiment, the first representation is optical and the cable is an opto-cable comprising one or more optical fibres. However, the concept is not limited thereto, the second representation may instead be electrical and communicated on a pair of leaders.

In a following action 504, the pluggable transceiver selects an active data-plane port to which the pluggable transceiver will distribute the data in the second representation in a final action 506.

The selection of action 504 is here controlled by an interface from the communication network node, e.g. an Inter-integrated circuit (I²C) interface via the pin-out arrangement, and the pluggable transceiver selects the active data-plane accordingly.

Figure 6:
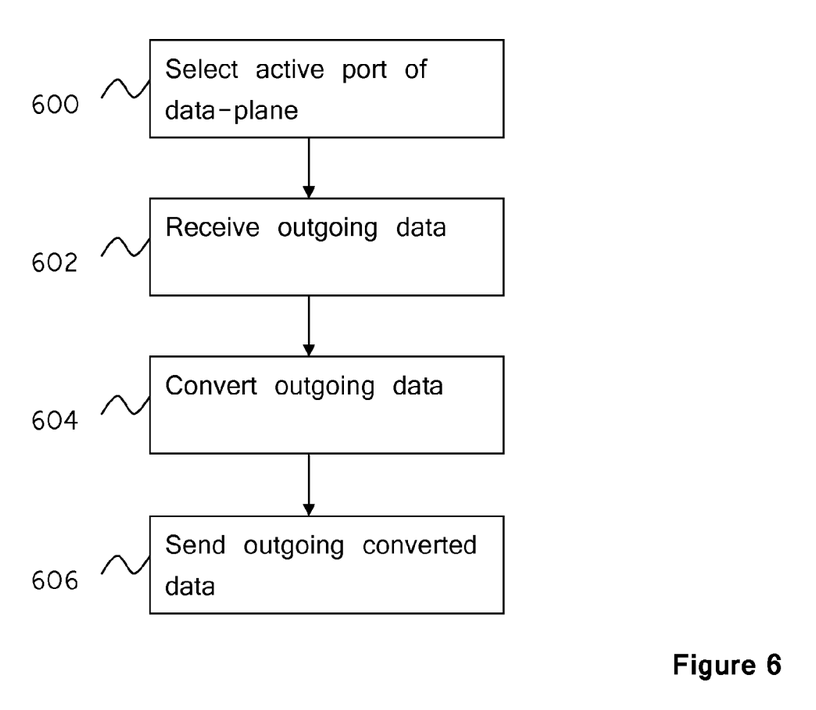
FIG. 6 is a flow chart illustrating a procedure in an arrangement for transmission of data, according to a possible exemplifying embodiment.

With reference to FIG. 6, a method in a pluggable transceiver for providing redundant communication of outgoing data in a communication network node of a communication network from data-plane ports will now be described in accordance with an exemplifying embodiment. The pluggable transceiver is inserted in a socket of an arrangement, e.g. a line board of the communication network node, and is connected to another second communication network node via a cable. When inserted in the socket, the pluggable transceiver is further directly connected to a plurality of data-plane ports via a pin-out arrangement in the socket. For instance, there may be 2 data-plane ports or 4 data-plane ports to which the pluggable transceiver is directly connected.

In a first action 600, the pluggable transceiver selects an active data-plane port to receive outgoing data from in a second representation. In this exemplifying embodiment, the pluggable transceiver is controlled by the communication network node and receives a signal on an interface, e.g. I²C-based, according to which the pluggable transceiver selects the active data-plane port. In a subsequent action 602, the pluggable transceiver receives outgoing data from the selected data-plane port. The outgoing data is then in a second representation, and is in subsequent action 604 converted into a first representation. As discussed above, for another exemplifying embodiment, the first representation and the second representation are suitable for communication of data on different distances.

In final action 606, the pluggable transceiver transmits the outgoing data in the second representation to the second communication network node via the cable In an alternative exemplifying embodiment which is based on the one described above, the pluggable transceiver is capable of selecting the active data-plane port itself. In the action 600, the pluggable transceiver monitors then the data-plane ports which are directly connected in order to detect activity on the data-plane port. When activity is detected on one data-plane port, it is selected as the active data-plane port.

It should be noted that the FIGS. 3a-b, and 4a-b illustrate various functional units in the pluggable transceivers 300a, 300b, 400a, 400b and the skilled person is able to implement these functional units in practice using suitable software and hardware. Thus, the solution is generally not limited to the shown structures of the pluggable transceivers 300a, 300b, 400a, 400b, and the functional units may be configured to operate according to any of the features described in this disclosure, where appropriate. For instance, any functionality in a specific functional unit may be placed in another suitable functional unit inside the SFP module, where appropriate.

Moreover, it is to be understood that the pluggable transceivers according to the exemplifying embodiments described above are examples of implementations according to the concept. A designer of high-availability transceivers is not limited to the described number of incoming cables and data-plane ports. He/she is free to select a suitable number of cables and data-plane ports when designing pluggable transceivers according to the defined concept, e.g. 7 cables and 8 ports of data-planes, 15 cables and 16 ports of data-planes, etc.

While the solution has been described with reference to specific exemplary embodiments, the description is generally only intended to illustrate the inventive concept and should not be taken as limiting the scope of the solution. The solution is defined by the appended claims

ABBREVIATIONS

SFP Small form factor pluggable transceiver
SFP+ Small form factor pluggable plus transceiver
C-SFP Compact small form factor pluggable transceiver
C-SFP+ Compact small form factor pluggable plus transceiver
QSFP Quad small form factor pluggable transceiver
QSFP+ Quad small form factor pluggable plus transceiver

The invention claimed is:

1. A method performed in a pluggable transceiver for achieving a redundant connection in a communication network when the pluggable transceiver is inserted in a first communication network node of the communication network, the pluggable transceiver being connected to a first cable on a first input and directly connected to two or more data-plane ports when inserted, the method comprising:
    receiving incoming data in a first representation from a second communication network node in the communication network;
    converting the incoming data into a second representation;
    selecting a first data-plane port among the two or more data-plane ports based on a detection of which of the two or more data-plane ports are active, the first data-plane port being active, wherein the detection is performed by a detector arranged in the pluggable transceiver; and distributing the incoming data in the second representation to the first data-plane port.

2. The method according to claim 1, wherein selecting the first data-plane port is further based on information received from the first communication network node via an external interface.

3. The method according to claim 2, wherein the external interface is in accordance with an Inter-integrated Circuit (I²C) standard.

4. The method according to claim 1, wherein the pluggable transceiver is further connected to one or more further cables on respective further inputs, wherein one or more further data-plane ports among the two or more data-plane ports are selected when selecting, the further data-plane ports being active, and wherein incoming data received on the further cables is distributed to corresponding respective further data-plane ports when distributing.

5. A method performed in a pluggable transceiver for achieving a redundant connection in a communication network when the pluggable transceiver is inserted in a first communication network node of the communication network, the pluggable transceiver being connected to a first cable on a first input and directly connected to two or more data-plane ports when inserted, the method comprising:
 selecting a first data-plane port among the two or more data-plane ports based on a detection of which of the two or more data-plane ports is active, the first data-plane port being active, and selecting the data-plane port detected as active as the first data-plane port,
 receiving outgoing data from the first data-plane port in a first representation,
 converting the received outgoing data into a second representation, and
 sending the outgoing data in the second representation to a second communication network node in the communication network.

6. The method according to claim 5, wherein selecting the first data-plane port is based on information received from the first communication network node on an external interface.

7. The method according to claim 6, wherein the external interface is in accordance with an Inter-integrated Circuit (I²C) standard.

8. The method according to claim 5, wherein the pluggable transceiver is further connected to one or more further cables on respective further inputs, wherein one or more further data-plane ports among the two or more data-plane ports are selected when selecting, the further data-planes ports being active, and wherein outgoing data received from the further data-plane ports is distributed to corresponding respective cables when sending.

9. A pluggable transceiver for achieving a redundant connection in a communication network when inserted in a communication network node of the communication network, the pluggable transceiver being connected to a first cable on a first input and being directly connected to two or more data-plane ports when inserted, the pluggable transceiver comprising:
 a converter adapted to receive incoming data in a first representation and convert the incoming data from the first representation into a second representation;
 a distributor adapted to distribute the incoming data to a first data-plane port among the two or more data-plane ports in the second representation;
 a first selector comprising a detector adapted to detect that one data-plane port among the two or more data-plane ports is active, the first selector adapted to select the one data-plane port detected as active, as the first data-plane port, and receive outgoing data from the first data-plane port in the second representation; and the converter further adapted to convert the outgoing data from the second representation into the first representation and transmit the outgoing data in the first representation on the first cable.

10. The pluggable transceiver according to claim 9, wherein the first selector is further adapted to select the first data-plane port based on information received from the first communication network node on an external interface.

11. The pluggable transceiver according to claim 10, wherein the external interface is in accordance with an Inter-Integrated Circuit (I²C) standard.

12. The pluggable transceiver according to claim 9, wherein the distributor is a copying unit adapted to copy the incoming data in the second representation, and distribute the incoming data in the second representation to one or more further data-plane ports among the two or more data-plane ports.

13. The pluggable transceiver according to claim 9, wherein the distributor is a second selector which is adapted to select the first data-plane port based on information received from the first communication network node.

14. The pluggable transceiver according to claim 9, wherein the distributor is a second selector which is adapted to select the data-plane port detected as active as the first data-plane port.

15. The pluggable transceiver according to claim 9, further adapted to be connected to one or more further cables on respective further inputs, wherein:
 the converter is further adapted to receive incoming data from the further cables in a first representation and convert from the first representation into the second representation;
 the distributor is further adapted to distribute incoming data from the further cables to corresponding respective data-plane ports among the two or more data-plane ports when distributing the incoming data in the second representation;
 the first selector is further adapted to select one or more further data-plane ports among the two or more data-plane ports and receive outgoing data from the further data-plane ports in the second representation, the further data-plane ports being active; and
 the converter is further adapted to convert the outgoing data from the further data-plane ports from the second representation into the first representation and transmit the outgoing data from the further data-plane ports in the first representation to the corresponding further cables.

16. The pluggable transceiver according to claim 15, wherein the pluggable transceiver is directly connected to four data-plane ports, where one of the four data-plane ports is the first data-plane port and is active, and three of the four data-plane ports are in a standby mode.

17. The pluggable transceiver according to claim 15, wherein the pluggable transceiver is connected to two cables and directly connected to four data-plane ports, where one of the two cables is the first cable, two of the four data-plane ports are active, and two of the four data-plane ports are in a standby mode.

18. The pluggable transceiver according to claim 15, wherein the pluggable transceiver is connected to three cables and directly connected to four data-plane ports, where one of the three cables is the first cable, three of the four data-plane ports are active, and one of the four ports is in a standby mode.

* * * * *